United States Patent [19]

Ford

[11] 4,278,196
[45] Jul. 14, 1981

[54] STORAGE TRAY

[75] Inventor: Harold H. Ford, Claremont, Calif.

[73] Assignee: Acme General Corporation, San Dimas, Calif.

[21] Appl. No.: 106,457

[22] Filed: Dec. 26, 1979

[51] Int. Cl.³ .......................... B65D 5/20; A47B 7/02
[52] U.S. Cl. .................. 229/30; 248/220.1; 248/345.1; 220/4 F; 220/62
[58] Field of Search .................. 220/62, 4 F; 229/30; 248/345.1, 220.1

[56] References Cited

U.S. PATENT DOCUMENTS

| | | | |
|---|---|---|---|
| 1,061,619 | 5/1913 | Lofland | 229/47 |
| 1,212,219 | 1/1917 | Hescheles | 229/49 |
| 1,517,528 | 12/1924 | Blackman | 220/62 |
| 2,155,128 | 4/1939 | Gray | 220/62 |
| 2,216,147 | 10/1940 | Ward | 220/62 |
| 2,463,780 | 3/1949 | Korrol | 220/62 UX |
| 2,673,657 | 3/1954 | Bergh et al. | 220/4 |
| 3,035,735 | 5/1962 | Presnick | 229/30 X |
| 3,047,183 | 7/1962 | Papa | 220/4 F |
| 3,236,404 | 2/1966 | Boscamp | 220/4 F |
| 3,590,753 | 7/1971 | Blink | 248/345.1 X |
| 3,797,724 | 3/1974 | Downing | 220/4 F X |
| 4,210,274 | 7/1980 | Leonard | 229/49 |

FOREIGN PATENT DOCUMENTS

| | | | |
|---|---|---|---|
| 1176213 | 11/1958 | France | 248/345.1 |
| 678708 | 12/1964 | Italy | 220/62 |
| 1169727 | 11/1969 | United Kingdom | 220/62 |

*Primary Examiner*—Davis T. Moorhead
*Attorney, Agent, or Firm*—Christie, Parker & Hale

[57] ABSTRACT

A readily assembled tray for storing articles under a bed or the like is formed from a flat, elastically bendable rectangular sheet (12) which is bent near each edge and corner for forming integral bottom and sides of the tray without creasing the sheet. Each corner of the sheet is notched to permit such bending. Four rigid side rails (13) are detachably connectable along edges of the sheet for collectively forming a rigid rim for the tray. Four corner connectors (14) secure edges of the notches together at the corners and secure the rails on the edges of the sheet. Preferably each of the corner connectors is an integral plastic molding in the form of a concave clamshell mating with an outside of a corner and a convex clamshell mating with an inside of the corner and connected to the outer clamshell by a membrane of plastic serving as a hinge line running diagonally across the corner. Elastic tangs (37) latch the two moieties of each corner connector to each other and to the sheet.

54 Claims, 11 Drawing Figures

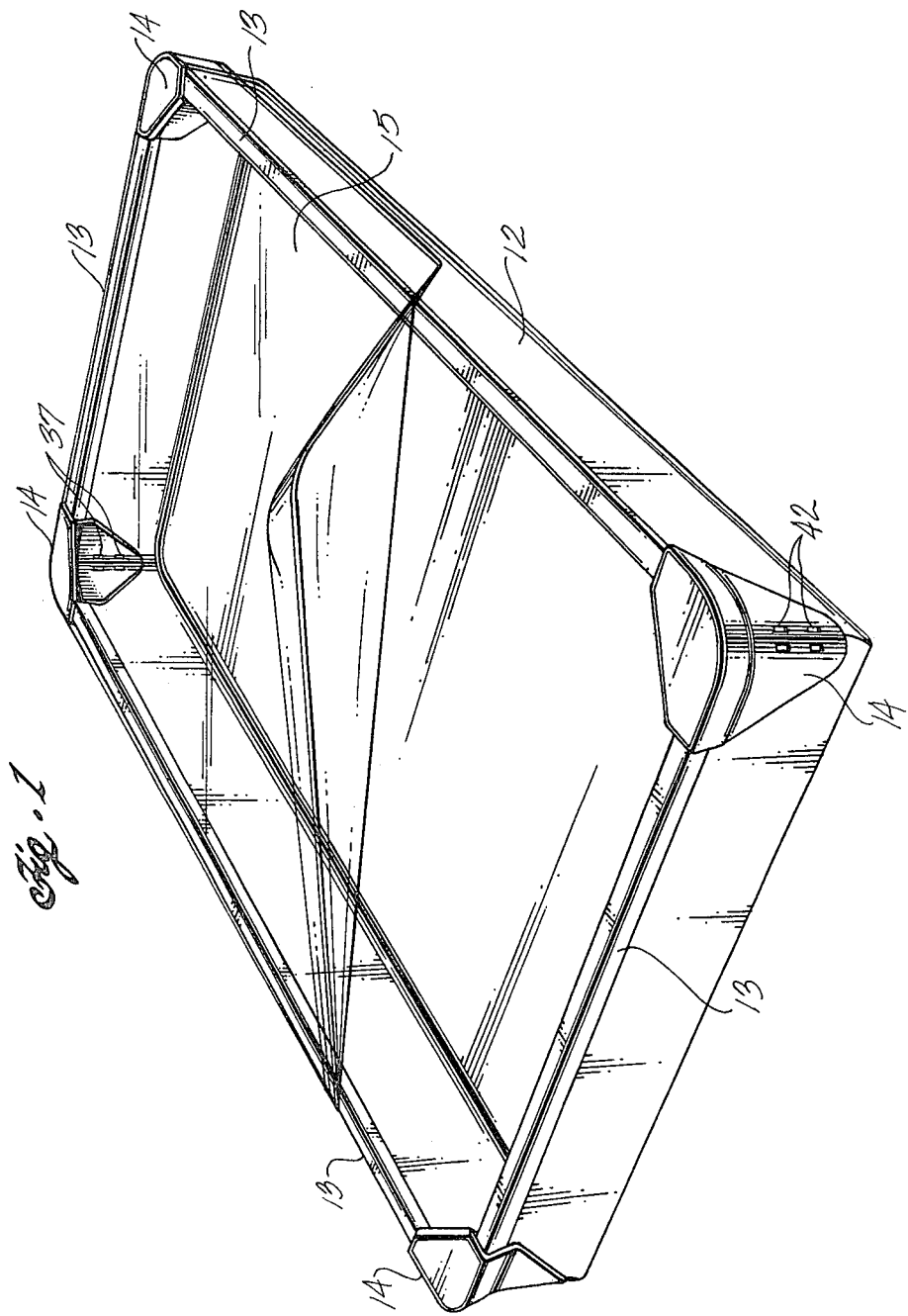

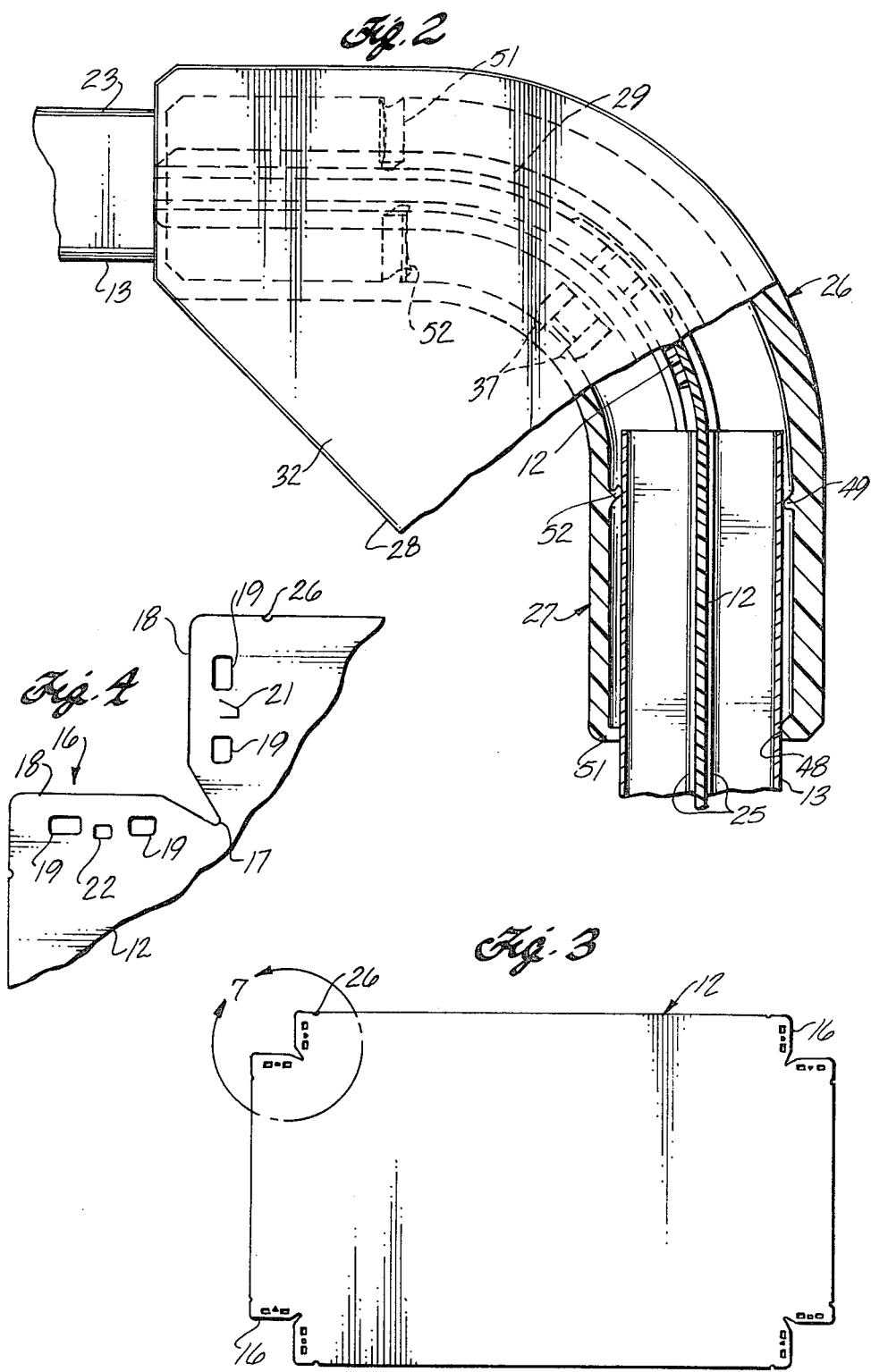

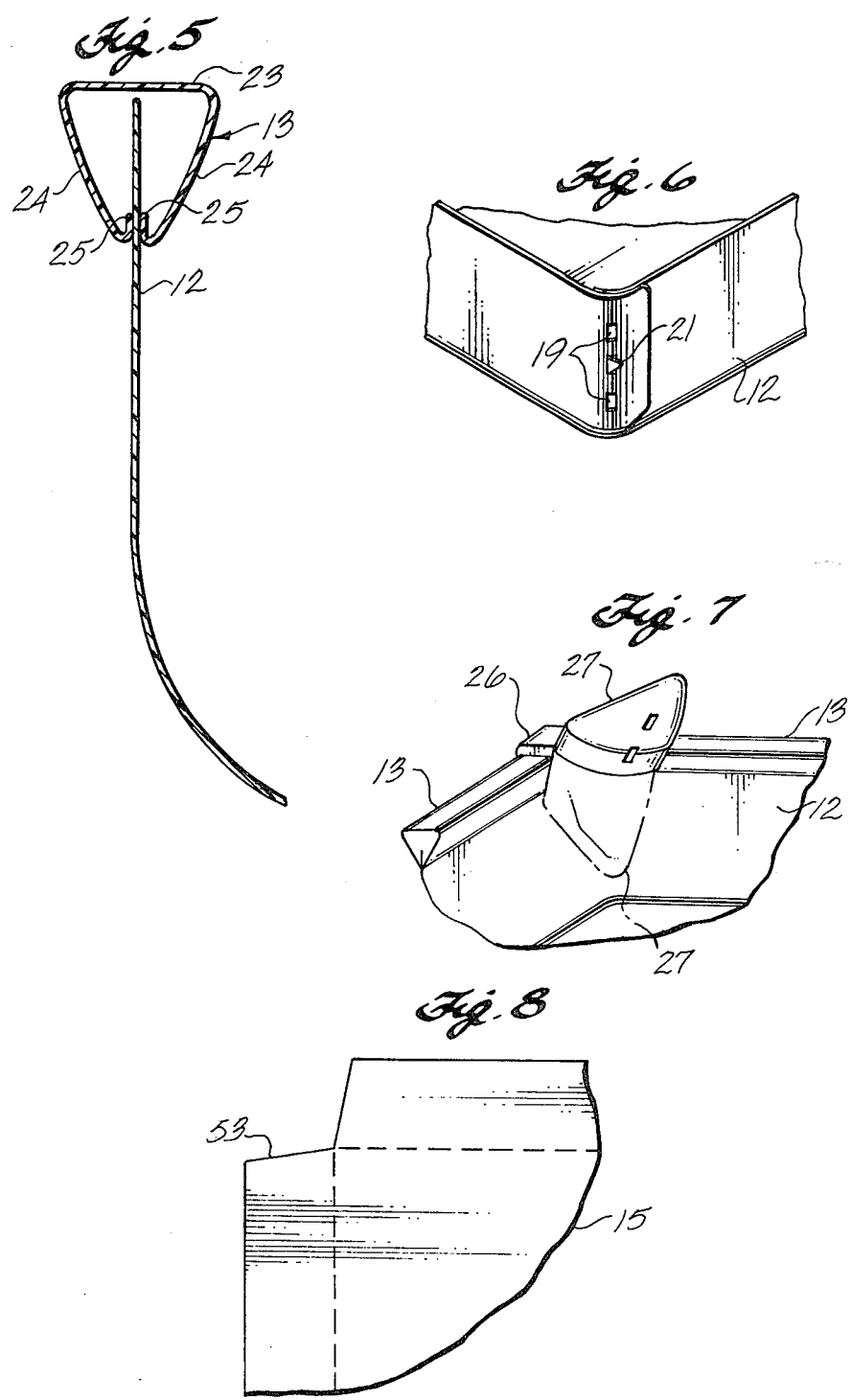

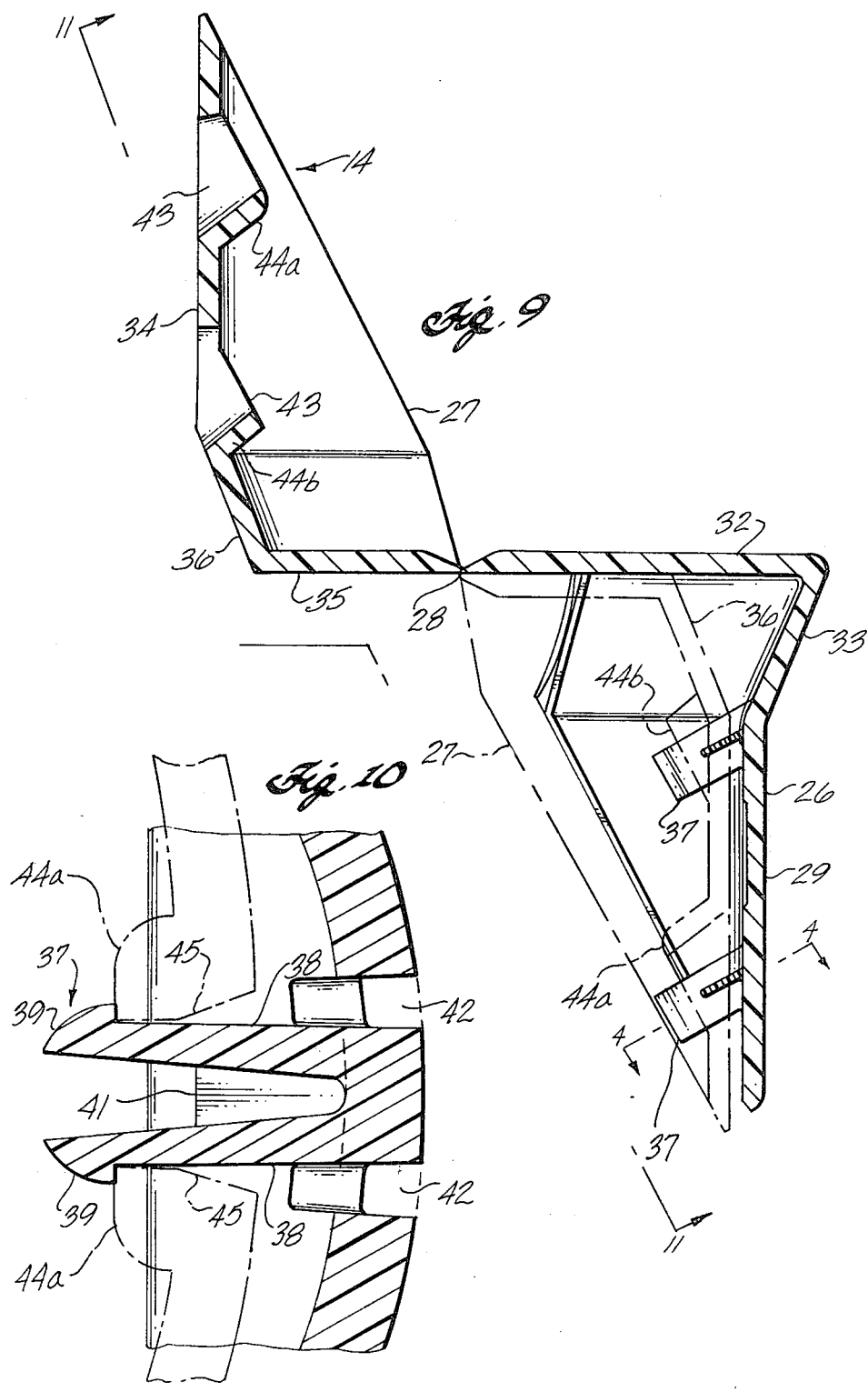

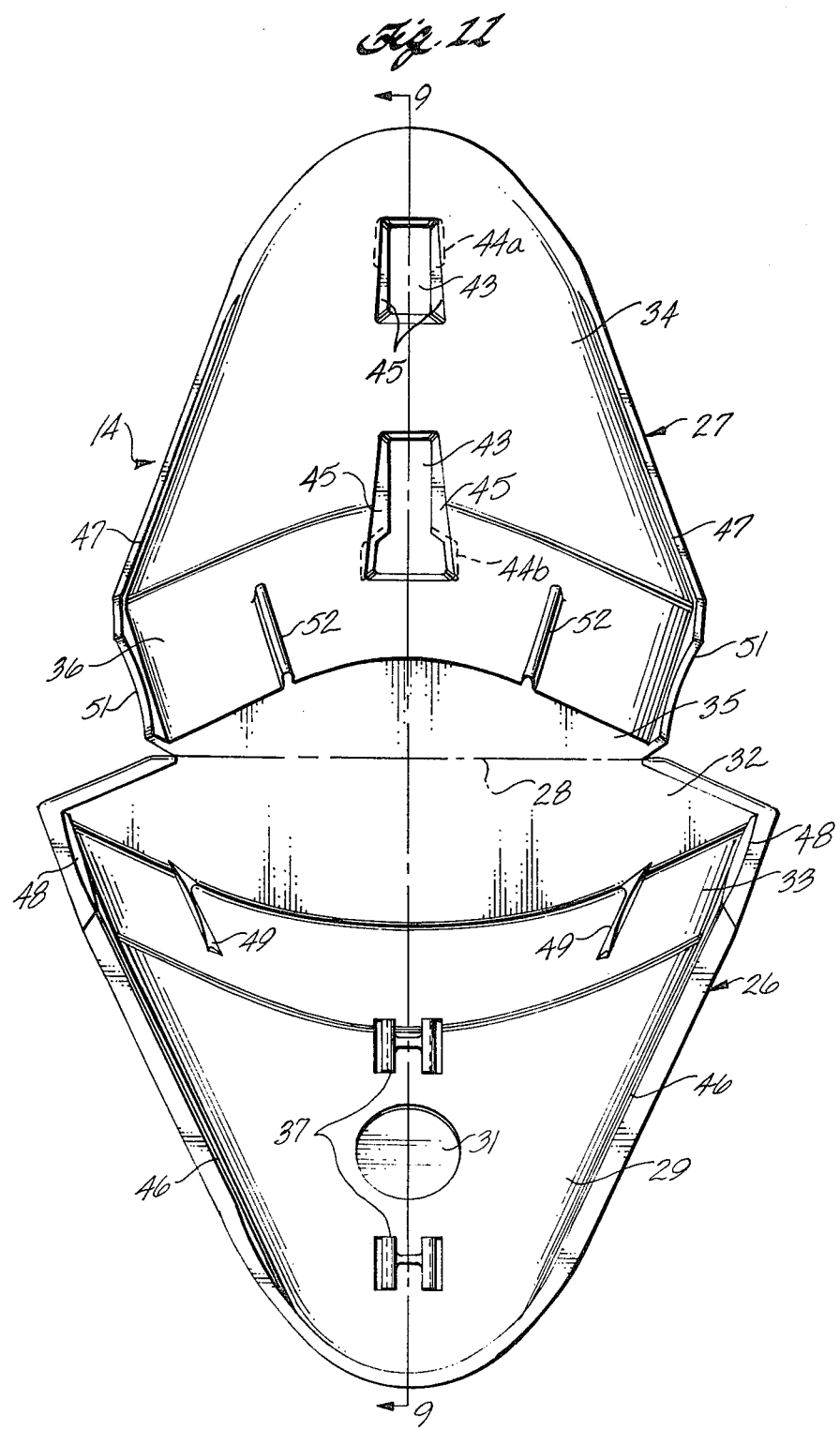

STORAGE TRAY

BACKGROUND OF THE INVENTION

This invention concerns a storage tray which is readily assembled and useful for sliding under a bed, bureau, or other low article of furniture.

A substantial amount of unused storage space is available in many households underneath the beds. At present if this space is used at all, it is apt to be cluttered with many loose objects which are inconvenient to retrieve. It is therefore desirable to have a container which can be slid under a bed for containing miscellaneous articles for storage.

Surplus drawers from old bureaus or dressers and miscellaneous cardboard boxes have been used with limited success. Surplus drawers are not commonly available and do not have covers to keep out lint and dust. Cardboard boxes of a convenient size are not readily available and suitable size boxes are commonly of flimsy construction.

It can also be convenient to use space under a bureau or the like for storage, but this location is exposed and loose articles or cardboard boxes are unsightly. Such storage space is therefore essentially unavailable.

It is therefore desirable to have a storage container which can be easily and conveniently slid under a bed, bureau or other article of furniture for storing miscellaneous objects. Preferably the container can be covered to protect the contents from accumulations of dust and lint. Since such a container may be exposed to view it should be attractive. Such a container should be sturdy for many years of use and to be suitable for carrying even heavy objects. Both cost and weight of the storage container should be minimal.

It is also desirable that the container be available in a disassembled state to occupy the least space for shipment and display. A disassembled storage container should have a minimal number of separate pieces for low manufacturing cost and should avoid the use of loose fasteners which can be misplaced before or during assembly. The storage container should be readily and quickly assembled without special tools or skills. The completed container should be attractive, easily covered and easy to slide under a bed or the like.

BRIEF SUMMARY OF THE INVENTION

There is, therefore, provided in practice of this invention according to a presently preferred embodiment a storage tray comprising a flat, elastically bendable rectangular sheet for forming the bottom and sides of the tray without creasing the sheet. Each corner of the sheet is notched to permit such bending. Four rigid side rails are detachably connectable along edges of the sheet for collectively forming a rigid rim for the tray. Four corner connectors secure edges of the notch together at corners of the tray and secure adjacent rails on the edges of the sheet.

Preferably, each of the corner connectors is an integral plastic molding in the form of a concave clamshell moiety mating with an outside of a corner and a convex clamshell moiety mating with an inside of the corner and connected to the outer clamshell by a web of plastic serving as a hinge line running diagonally across the corner. Tangs extend from one moiety of the corner connector through openings in the sheet adjacent each edge of the notch and through apertures in the other moiety for latching the corner connector and securing the rails and sheet.

DRAWINGS

These and other features and advantages of the present invention will be appreciated as the same becomes better understood by reference to the following detailed description when considered in connection with the accompanying drawings wherein:

FIG. 1 is a perspective view of a storage tray constructed according to principles of this invention;

FIG. 2 is a top view of one corner of the tray partially cut away;

FIG. 3 is a flat sheet bendable to form the sides and bottom of a storage tray;

FIG. 4 is a detail of one corner of the sheet;

FIG. 5 is a representative cross section of an edge of the storage tray;

FIG. 6 is a sketch illustrating temporary assembly of a corner of the tray;

FIG. 7 is a sketch illustrating assembly of a corner connector on the tray;

FIG. 8 is a detail of one corner of a cover for the tray;

FIG. 9 is a cross section of one corner connector along a plane bisecting the corner of the tray;

FIG. 10 is a detail of a latching tang for the corner connector; and

FIG. 11 is a face view of the corner connector looking to the right and up as viewed in FIG. 9.

DESCRIPTION

The storage tray which is illustrated in perspective in FIG. 1 comprises a plastic sheet 12 elastically bent to form the bottom and sides of the tray without creasing the sheet. Four rigid rails 13 fit on the edges of the sheet and collectively form a rigid rim for the tray. The sheet and rails are secured together by four corner connectors 14 so that in an exemplary embodiment the storage tray is formed of only nine parts. A transparent flexible plastic cover 15 can be slipped over the storage tray for protecting its contents.

The sheet 12 which forms the sides and bottom of the tray is illustrated in FIG. 3 with one corner illustrated in greater detail in FIG. 4. The sheet is preferably a reasonably stiff but readily bendable, abrasion resistant, tough plastic. It has been found that high density polyethylene about 0.028 inch thick performs very well. It is desirable to have a slightly roughened surface on the sheet to reduce gloss, such as can be readily obtained when the sheet is finished with sand blasted rolls. Any of a variety of attractive colors can be employed.

Each corner of the sheet has a generally V-shaped notch so that the sheet can be bent to form integral sides and bottom for the storage tray. Each notch 16 has an effective included angle from its root 17 to its intersection with the edge of the sheet of less than 90° so that when the edges of the sheet are bent upwardly to form the sides of the tray the two edges 18 of the notch overlap at the corner of the tray. The notch can be as narrow as a slit in the corner with more overlap than the illustrated embodiment. Preferably the root of the notch has a reasonable radius to minimize stress concentration at the root upon bending the sheet.

Each edge of the notch includes a pair of rectangular openings 19 through the sheet. When the edges of the notch are overlapped upon bending the sheet, the two pairs of openings are aligned in a plane bisecting the corner of the tray. The openings along each edge of the notch are on a line normal to the adjacent edge of the sheet so that when the openings are aligned the corner is substantially normal to the bottom of the tray.

Each notch also includes a hook 21 on one edge of the notch and an eye 22 in the opposite edge. The eye is in the form of a rectangular hole through the sheet. The hook is formed by making a generally U-shaped slit through the sheet with the open end of the U-shaped slit nearer the edge of the notch. The slit defines a U-shaped tab pointing away from the notch. The end of the U-shaped tab nearer the notch is connected to the sheet so that the free end of the tab further from the notch can be bent out of the plane of the sheet to catch in the eye. If desired the base of the tab can be creased slightly so that the tip of the tab is out of the plane of the sheet.

When two adjacent edges of the sheet are bent upwardly relative to the center portion of the sheet, the edges of the notch overlap at the corner of the tray. These edges of the notch are readily bent to bring the faces of the sheet together along opposite edges of the notch. The tip of the tab 21 slips through the eye 22 in the opposite edge of the notch and temporarily hooks the two edges together as illustrated in FIG. 6. This temporary hooking of the corner of the tray serves to maintain the openings 19 in alignment pending attachment of the corner connectors.

The plastic sheet is elastically bendable to form the intersection between the bottom and sides of the tray as a smooth curve without creasing. The smoothness of the curve is indicated in the representative cross section of FIG. 5. Similarly, the edges of the sheet adjacent the corner notches are bent elastically without creasing for overlapping at the corners of the storage tray. The curved profile along the bottom of the tray is more pronounced in the mid portion of the sides and becomes somewhat sharper near the corners of the tray. The bend is sharpest near the root of the notch at each corner where curving of the sheet is in all three dimensions.

The elastic bending of the sheet without creasing is of significant value in manufacturing and assembly of the storage tray. An embossed crease line which could be readily bent by the customer along the relatively long edges of the tray and at the corners would weaken the plastic sheet. Prebending of the crease is not an attractive alternative since it significantly increases the disassembled volume of the storage tray and would create shipping and storage problems between the manufacturer and consumer.

Additionally the gently curve along the bottom edges of the tray and the smooth surface of the plastic make it very easy to slide the storage tray under a bed or the like. The rounded profiles of the corners and lower edges of the tray are surprisingly attractive.

A rigid side rail is connected along each edge of the sheet and collectively the side rails form a rigid rim for the tray. As best seen in the cross section of FIG. 5 each of the rails 13 has a generally U-shaped cross section with a flat top portion 23 and two downwardly converging side portions 24. Near the bottom of each rail the side portions are curved inwardly and upwardly to form a pair of upstanding internal lips 25. The two lips are close together and firmly grip the edge of the sheet. Such a rigid rail is conveniently made by roll forming a prepainted steel strip to the desired shape. Plastic or aluminum extrusions are also suitable for forming rigid side rails for the tray.

Each side rail is cut to a length somewhat shorter than the distance between the notches at adjacent corners of the sheet. Small index nicks 26 (FIGS. 3 and 4) are provided on edges of the sheet near each corner notch. The rails are assembled on the edges of the sheet so that the ends of the rails are adjacent the index nicks. It has been found easiest to assemble a tray by first sliding the side rails on the edges of the sheet and then bending the sheet for latching the hook and eye at each corner as hereinabove described.

Each of the four corners of the storage tray is then permanently connected by a corner connector which also secures the adjacent rails on the edges of the sheet. In an exemplary embodiment each corner connector is an injection molded plastic part, preferably made of polypropylene. The plastic can be colored to blend well with the color of the sheet and rails, making the entire storage tray an atractive article.

Broadly speaking the corner connector is somewhat like a clamshell having one concave moiety 26 that fits over the outside of a corner of the tray, a convex moiety 27 that fits within the corner of the tray, and a flexible hinge 28 interconnecting the two moieties along a hinge line extending diagonally across the corner inside the tray near the top. The hinge comprises a web or membrane of plastic integral with the clamshell moieties and thin enough to withstand repeated bending as a hinge. The hinge in an exemplary embodiment takes advantage of this property of polypropylene to form what has come to be known as a living hinge. The web of polypropylene is molded to have a nominal thickness of about 0.01 inch along a hinge line 28 between the two clamshell moieties and can withstand repeated flexing through 180° without breaking. Such a web is molded to have no sharp edges at its intersection with adjacent thicker portions of the connector.

Such a corner connector is assembled on the tray as indicated in the sketch of FIG. 7 by placing the outer clamshell moiety 26 on the outside of a corner and pivoting the inside convex moiety 27 around the hinge line into the corner and latching the two moieties together as described in greater detail hereinafter.

The corner connector is illustrated in FIG. 9 in a cross section taken along a plane bisecting a corner of the tray. The corner connector is illustrated in solid lines as molded and before assembly on the corner of a tray. The inner moiety 27 of the corner connector is also illustrated in phantom in its position when pivoted into the inside corner of the tray and latched with the outside moiety 26. FIG. 11 illustrates the corner connector from one face in its as-molded position as if viewed from line 11—11 in FIG. 9.

The outer moiety 26 of the corner connector has a concave side portion 29 curved to fit around the outside of the overlapped portions of the sheet at the corner of the tray. A shallow pocket 31 in the center of the curved side portion provides clearance for the hook 21 (FIG. 4) at the corner of the sheet. When the corner connector is assembled on the tray the curved side portion 29 is essentially vertical. The outside moiety also includes a flat top portion 32 which is substantially perpendicular to the curved side portion; thus, when assembled on the corner of a tray the top portion is substantially horizontal. The top portion overlies the top of each of a pair of adjacent side rails 13 and retains the rails on the edges of the sheet. The curved side portion and top portion of the outer clamshell moiety are interconnected by an upwardly and outwardly sloping surface 33. Near each of its outer ends the sloping surface 33 is straight and conforms approximately to the outside shape of a rail and in the mid-portion it continues in a curve along substantially the same line for a smooth and attractive corner.

The inner clamshell moiety 27 has a curved side portion 34 substantially complementary to the inside of the overlapped edges of the notch at the corner of the sheet. The inner moiety also has a flat top portion 35 which is approximately co-planar with the top portion 32 of the outer moiety as molded; and when the inner moiety is pivoted 180° around the hinge 28 upon assembly as illustrated in phantom in FIG. 9 the top portion 35 of the inner moiety abuts the top portion 32 of the outer moiety. The curved side portion 34 of the inner moiety and its top surface 35 are interconnected by an upwardly and inwardly sloping surface 36. The sloping surface near its outer edges is straight and conforms approximately to the shape of the inside of the rails 13 and in the mid-portion it curves smoothly between the two straight portions.

When the corner connector is assembled on the corner of a tray, the two moieties are latched together by connector means integral with the corner connector. A tang extends from one moiety of the connector through apertures in the outer moiety for latching. Thus, the outer clamshell moiety has two sets of tangs 37 extending inwardly from the curved side portion 29. As best seen in FIG. 10 each tang comprises a pair of rectangular posts 38 each of which has a half arrowhead 39 at its end. A thin web 41 extends between the two posts 38 and tends to stabilize the two half arrow members of the tang. A pair of holes 42 extend through the curved side portion 29 as clearance for the slides employed during molding of the corner connector.

The inside clamshell moiety has two apertures 43 through the curved side portion 34. Each of the apertures also extends through a raised boss 44 on the inner or concave side of the curved side portion 34. The side walls 45 of the apertures converge from the convex face of the inside moiety towards the end of the boss. The end of the lower boss 44a lies in a plane extending through the hinge line 28. The end of the upper boss 44b is parallel to that plane. The two sets of tangs 37 extend perpendicular to that plane.

The corner connectors are attached after the side rails are in position on the edges of the sheet and the corners of the sheet have been temporarily latched in bent overlapping position by the hook and eye. The outer moiety of the corner connector is pressed against the outside corner of the tray with the top portion 32 overlapping the tops of the rails. The two sets of tangs slip through the aligned openings 19 in a plane bisecting the corner of the tray. The inner moiety is then pivoted inwardly and downwardly around the hinge line 28 to fit inside the corner of the tray. Pressure on the inside moiety causes the half arrow tangs to be squeezed together by the converging side walls 45 of the apertures through the inside moiety. When the arrowheads 39 pass the end of the respective boss the tangs snap apart due to the elasticity of the plastic, thereby securely latching the two moieties of the connector together. The apertures 43 through the inside moiety have a length somewhat longer than the tangs to provide clearance for the tangs as the inside moiety is pivoted into the latching position. Vertical position of the two moieties is maintained by the web of plastic at the hinge line 28. The tangs 37 fit closely in a vertical direction through the openings 19 through the corner of the sheet, thereby preventing the corner connector from being raised relative to the bottom of the tray.

A small raised rim 46 is provided along each edge of the concave side portion 29 of the outside moiety. Similarly, a small raised rim 47 is provided along each edge of the concave face of the side portion 34 of the inside moiety. When the corner connector is latched in position on the corner of the tray, the rims 46 and 47 engage opposite faces of the sheet leaving little, if any, gap along the edges, while still maintaining clearance within the corner connector for the overlapped corner of the sheet.

When the corner connector is latched in position on the corner of the tray, the intermediate sloping surfaces 33 and 36 on the outer and inner moieties and the top surface 32 on the outer moiety encompass the ends of an adjacent pair of side rails 13. The side rails extend into the corner connector about one and one-fourth inch from each side as indicated in the top view of FIG. 2.

Clearance is provided between the rails and the inside of the two moieties of the connector except at spaced apart locations where the two moieties grip the rails to maintain them at right angles and minimize racking of the tray. A raised lip 48 is provided at each end of the sloping portion 33 of the outer moiety and spaced about an inch therefrom is a ridge 49 on the inside of the sloping portion. A raised lip 51 is provided at each end of the sloping portion 36 on the convex inside moiety. A pair of ridges 52 are provided on that surface at locations opposite the ridges 49 on the outside moiety. The lips and ridges are curved to conform to the sides 24 (FIG. 5) of the respective side rails. Thus, as indicated in FIG. 2 when the corner connector is latched, the ridges 49 and 52 grip the sides of the rail near its end and the lips 48 and 51 grip the sides of the rail at a location spaced apart from the end of the rail. The rails are secured along the edges of the sheet by the top portion 32 of the corner connector. Lateral shifting of the rails and racking of the rim of the tray are avoided.

By having the corner connector with latching means extending through the sheet with a top over the rails, and with inside and outside clamshells gripping the sheet and two rails in each corner, a tight and secure joint is made. The integral corner connector with a web of plastic web serving as a living hinge extending diagonally across the corner of the tray minimizes the number of pieces required for assembly of the tray. The combination of a hinge line between the two moieties and a snap connector between the moieties makes assembly quite easy. By having the half arrow tangs integral with one moiety of the connector and passing through openings through the sheet and latching with the other moiety, a secure connection is made with no loose connectors to be misplaced. In addition, the somewhat cupped cavity within the inside moiety provides a convenient location for gripping or lifting of the tray.

It might be noted that to disassemble the tray one can pinch the half arrow tangs towards each other so that the two moieties are unlatched. These can be pinched together with the fingertips and the lower set unlatches a slight distance before the upper set for ease of disassembly. The balance of the disassembly is a reversal of the assembly steps.

A flexible, transparent plastic cover 15, such as vinyl about four mils thick, keeps lint and dust out of the storage tray. Such a cover can be made from a rectangular sheet of vinyl plastic, and preferably an obtuse notch 53 is provided in each corner of the flat sheet as indicated in FIG. 8. When the two edges of this notch are brought together and connected by a stitched binding or the like, a "tray-shaped" cover is formed which is somewhat wider near the top of the storage tray than nearer the bottom of the storage tray. The corner connectors and rails also make the storage tray wider at the top than nearer the bottom. Such a cover therefore fits well around the perimeter of the tray but is loose enough over the top of the tray to accommodate articles higher than the depth of the tray. A binding is desirably stitched around the perimeter of such a dust cover to minimize the possibility of tearing. A flexible dust cover can also have grommets to hook over posts added to the corner connectors if desired.

If a somewhat stiffer cover is desired, it can be readily formed by assembly from a flat sheet, four rails and four corner connectors in a manner substantially identical to the storage tray. In such an embodiment the sheet is made slightly larger than the sheet for forming the tray and the rails are made slightly longer, so that the cover is slightly larger than the storage tray. The corner connectors for the cover are identical to those for the storage tray with the addition of a raised ledge above the flat surface 32 on the outer moiety at its intersection with the sloping surface 33. Such ledges at each corner fit around the outside of the corners of the storage tray for minimizing displacement of this embodiment of cover.

A storage tray as hereinabove described and illustrated is preferably made, packaged and sold in disassembled condition and assembled by the customer. A storage tray and cover 20 by 36 by 4½ inches can be easily packaged in a 4½ inch square box 33 inches long. The flat sheet is rolled into a cylinder and slipped into such a box. The four side rails fit into the four corners of such a box. The four corner connectors and rolled dust cover drop into the center of the cylinder. Alternatively if desired, the disassembled storage tray can be packaged by slipping circular caps on each end of the rolled sheet with the side rails, corner connectors, and dust cover inside. The cylindrical package can then be encased in a shrink fit plastic envelope for shipment, display and sale.

Although the structure has been described as a storage tray, other uses for a "tray-shaped" will be apparent. Thus, for example, handles can be added to the side rails to make a basket. The corners can be sealed to make a wading pool. The structure can be used as a planter, sandbox, animal litter box, car top luggage rack, or the like. Many other uses for a smooth, simple, lightweight, attractive tray-like structure will be apparent.

Although described in the preferred embodiment in appreciable detail, many modifications and variations will be apparent to one skilled in the art. Thus, for example, instead of using an integral living hinge between the two moieties of the corner connector, other attachments can be suitable. For example, a cylindrical "socket" can be formed along the hinge line on the outside moiety for receiving a cylindrical edge on the inside moiety. The result is a two piece corner connector fitting together much like the embodiment hereinabove described and illustrated. In other embodiments a plurality of snap connectors through the corners of a sheet latching with a moiety of the corner connector can provide sufficient interconnection that direct connection of the moieties along a hinge line can be deleted. Other patterns of openings through the corners of the sheet, arrangements for temporarily latching the corners of the sheet during assembly and details of the connectors between the moieties of the corner connector will be apparent. It will also be apparent that with minor modifications of the corner connectors, the tray can be made in another shape instead of rectangular, such as for example, a hexagon. Two additional side rails would be included in such an embodiment as well as two additional corner connectors. Further, if desired, edges of the sheet between the corner notches can be embossed or convoluted by vacuum forming for stiffening the edges and so that separate rigid rails are not needed. Such stiffening can interfere with rolling the sheet for shipping. It is therefore to be understood that within the scope of the accompanying claims, this invention may be practiced otherwise than as specifically described.

What is claimed is:

1. A tray comprising:
   a flat elastically bendable sheet for forming the bottom and sides of the tray without creasing the sheet, each corner of the sheet being notched for overlapping edges of the notch upon elastic bending of edges of the sheet into a plane approximately normal to the plane of the center of the sheet;
   a plurality of rigid side rails each having a generally U-shaped cross section for receiving an edge of the sheet between the notches, the rails collectively forming a rim of the tray; and
   a plurality of corner connectors, each corner connector including means for gripping each of a pair of adjacent rails at a corner of the tray and means for securing both overlapping edges of a notch at the corner of the tray.

2. A tray as recited in claim 1 further comprising:
   at least one opening through the sheet adjacent each edge of each notch;
   wherein the portion of the sheet adjacent the edges of the notch is elastically bendable without creasing the sheet for aligning the openings on opposite edges of the notch; and wherein
   the means for securing overlapping edges of each notch comprises tang means on each corner connector extending through such aligned openings for securing the sheet at each corner of the tray.

3. A tray as recited in claim 2 wherein the tang means extends through aligned openings in a plane bisecting the corner of the tray.

4. A tray as recited in claim 3 wherein the openings comprise at least a pair of openings through the sheet on each edge of the notch, the openings along each edge of the notch being on a line normal to the adjacent edge of the sheet so that when the openings are aligned on a plane bisecting the corner of the tray, the corner is substantially normal to the plane of the center of the sheet.

5. A tray as recited in claim 2 wherein each corner of the sheet further comprises means for temporarily connecting the edges of the notch together in overlapping relation with such openings aligned.

6. A tray as recited in claim 1 wherein each corner of the sheet further comprises an eye through the sheet adjacent one edge of the notch and a hook on the sheet on the other edge of the notch, the hook comprising a generally U-shaped slit through the sheet defining a U-shaped tab connected to the sheet at the end nearer the notch so that the free end of the tab further from the notch can be bent out of the plane of the sheet for engaging the eye.

7. A tray as recited in claim 1 wherein each corner connector includes a portion extending over the top of each of a pair of adjacent rails for securing the rails on the edges of the sheet.

8. A tray as recited in claim 1 wherein each corner connector comprises an outside moiety fitting over an outside of a corner of the tray, an inside moiety fitting inside a corner of the tray and means securing the two moieties together.

9. A tray as recited in claim 8 wherein the means for securing the two moieties together comprises hinge means extending diagonally across the corner of the tray at the top of the tray.

10. A tray as recited in claim 8 wherein the means for securing the two moieties together comprises aperture means on one moiety and tang means on the other moiety for extending through the aperture means and for securing overlapping edges of the notch.

11. A tray as recited in claim 10 wherein the means for securing the two moieties together comprises hinge means extending diagonally across the corner of the tray at the top of the tray.

12. A tray comprising:
a flat elastically bendable rectangular sheet for forming the bottom and sides of the tray without creasing the sheet, each corner of the sheet having a generally V-shaped notch and at least one opening through the sheet adjacent each edge of each notch;
four rigid rails, each rail being detachably connectable along an edge of the sheet for collectively forming a rigid rim for the tray;
four corner connectors, each corner connector comprising:
a concave outside moiety mating with the outside of a corner of the tray;
a convex inside moiety mating with the inside of a corner of the tray;
tang means on one moiety extending through the openings through the sheet and connecting to the other moiety for securing the two moieties together and for securing the two edges of the notch together; and
means for securing a pair of adjacent rails on the edges of the sheet.

13. A tray as recited in claim 12 wherein each corner connector comprises means for interconnecting the outside moiety and the inside moiety along a hinge line extending diagonally across the corner inside the tray.

14. A tray as recited in claim 13 wherein the means for interconnecting the two moieties comprises a plastic membrane integral with the two moieties and thin enough to withstand repeated bending.

15. A tray as recited in claim 12 wherein the edges of each notch overlap for aligning such openings through the sheet in a plane bisecting the corner of the tray and the tang means extends through such aligned openings.

16. A tray as recited in claim 15 wherein the tang means extend inwardly from the outside moiety and the inside moiety comprises apertures for receiving the tang means in locking engagement.

17. A tray as recited in claim 15 wherein the openings comprise at least a pair of openings through the sheet on each edge of the notch, the openings along each edge of the notch being on a line normal to the adjacent edge of the sheet so that when the openings are aligned on a plane bisecting the corner of the tray, the corner is substantially normal to the plane of the center of the sheet.

18. A tray as recited in claim 12 wherein each rail is shorter than a corresponding side of the tray, the sheet adjacent the edges of the notch is elastically bendable without creasing for forming a rounded corner on the tray and the outside moiety is rounded to correspond to the rounded corner and includes a portion overlapping the ends of each of a pair of adjacent rails for securing the rails on the edges of the sheet.

19. A tray comprising:
a flat elastically bendable rectangular sheet for forming the bottom and sides of the tray without creasing, each corner of the sheet having a generally V-shaped notch;
four rigid rails, each rail being detachably connectable along an edge of the sheet for collectively forming a rigid rim for the tray and being shorter than a corresponding side of the tray; and
four corner connectors detachably connectable at corners of the tray, each corner connector having means for securing the corners of the sheet together and means for gripping an end portion of each adjacent rail at two spaced apart locations along the length of the rail for holding the rails on the edges of the sheet at right angles to adjacent rails and limiting racking of the rim of the tray.

20. A tray as recited in claim 19 wherein each corner connector comprises an inside moiety for fitting inside the corner of the tray, an outside moiety for fitting outside the corner of the tray, means for securing the two moieties together with a portion of at least one moiety overlapping an end portion of each of the adjacent rails.

21. A tray as recited in claim 20 wherein the inside moiety and outside moiety collectively substantially completely surround an end portion of each of the adjacent rails.

22. A tray as recited in claim 20 wherein the means for gripping each rail comprises a lip along a lateral edge of each moiety for gripping the rail at a location remote from the end of the rail and a ridge on each moiety spaced apart from the lip for gripping the rail relatively nearer the end of the rail.

23. A tray as recited in claim 19 wherein each corner connector comprises an outside side portion extending along a side portion of the sheet and rails adjacent the corner, an inside side portion extending along a side portion of the sheet and rails adjacent the corner, and a top portion interconnecting the two side portions and extending over the tops of the rails.

24. A tray as recited in claim 23 wherein the top portion is integral with the outside side portion and is connected to the inside side portion by way of a hinge line extending diagonally across the corner inside the tray.

25. A tray as recited in claim 19 wherein the sheet adjacent each edge of each notch is elastically bendable without creasing between the end of an adjacent rail and the corner of the tray for forming a smoothly curving corner on the tray.

26. A tray comprising:
a rectangular sheet having a notch at each corner and bendable for forming the sides and bottom of the tray; and
four corner connectors for securing the corners of the sheet together, each corner connector comprising:

a concave clamshell mating with the outside of the corner;

a convex clamshell mating with the inside of the corner; and hinge means connecting the outside and inside clamshells along a hinge line extending diagonally across the corner inside the tray.

27. A tray as recited in claim 26 wherein the inside and outside clamshells are an integral plastic molding and the hinge means connecting the clamshells comprises a plastic membrane integral with the clamshells and thin enough to withstand repeated bending as a hinge.

28. A tray as recited in claim 26 wherein the sheet includes openings through the sheet adjacent the notch at each corner and each corner connector comprises means extending through such openings for securing the edges of the notch at each corner of the tray and securing the inside clamshell and outside clamshell tightly against the corner of the tray.

29. A tray as recited in claim 28 wherein the openings through the sheet adjacent each corner align and the means extending through the aligned openings are in a plane bisecting the corner of the tray.

30. A tray as recited in claim 29 wherein the openings comprise at least a pair of openings through the sheet on each edge of the notch, the openings along each edge of the notch being on a line normal to the adjacent edge of the sheet so that when the openings are aligned on a plane bisecting the corner of the tray, the corner is substantially normal to the plane of the center of the sheet.

31. A tray as recited in claim 26 further comprising four rigid rails, each rail being detachably connectable along an edge of the sheet for collectively forming a rigid rim for the tray, and wherein each corner connector includes a top portion overlying the ends of an adjacent pair of rails for securing the rails in position along the edges of the sheet.

32. A tray as recited in claim 26 wherein the portion of the sheet adjacent each edge of the notch at each corner is elastically bendable without creasing for forming a smoothly curving corner of the tray and the outside clamshell has a smoothly curving side portion mating with the corner.

33. A tray comprising:

a flat elastically bendable rectangular sheet for forming the bottom and sides of the tray without creasing the sheet, each corner of the sheet having a generally V-shaped notch having an included angle less than 90°, and at least one opening through the sheet at each edge of the notch located so that when adjacent edges of the sheet are elastically bent into a plane approximately normal to the plane of the center of the sheet the openings on each edge of the notch are aligned;

four rigid rails, each rail being detachably connectable along an edge of the sheet for collectively forming a rigid rim; and four corner connectors, each having a curved surface mating with the overlapped edges of the notch in a corner of the sheet and including means extending through an aligned pair of openings for securing the edges of the notch together.

34. A tray as recited in claim 33 wherein the sheet is elastically bendable along a line parallel to each edge of the sheet between adjacent corner notches without creasing the sheet for forming a smoothly curving transition between the bottom and sides of the tray.

35. A tray as recited in claim 33 wherein the openings align in a plane bisecting the corner of the tray.

36. A tray as recited in claim 35 wherein the openings comprise at least a pair of openings through the sheet on each edge of the notch, the openings along each edge of the notch being on a line normal to the adjacent edge of the sheet so that when the openings are aligned on a plane bisecting the corner of the tray, the corner is substantially normal to the plane of the center of the sheet.

37. A tray as recited in claim 33 wherein the sheet is bent adjacent the edges of the notch with a sufficient radius to avoid creasing the sheet and each corner connector has a curved concave surface mating with the overlapped edges outside a corner of the sheet, and wherein the means for securing comprises an elastic tang insertable through the openings towards the inside of the tray and including means for preventing withdrawl of the tang through the opening.

38. A tray as recited in claim 37 wherein each corner connector further comprises a connector moiety having a convex curved surface mating with the overlapped edges of the notch inside a corner of the sheet and including an aperture for receiving and latching the elastic tang.

39. A tray as recited in claim 33 wherein each rail is straight and has a length less than the corresponding side of the sheet and each corner connector includes a top portion extending over the ends of an adjacent pair of rails for securing the rails along the edges of the sheet.

40. A tray comprising:

a flat elastically bendable rectangular sheet for forming the bottom and sides of the tray without creasing the sheet, each corner of the sheet being notched for overlapping edges of the notch upon elastic bending of the edges of the sheet into a plane approximately normal to the plane of the center of the sheet and elastic bending of a portion of the sheet at each edge of each notch for forming a smoothly curving corner of the tray, and having at least one opening through the sheet at each edge of the notch so that when the edges of the notch are overlapped the openings on each edge of the notch are aligned at the corner of the tray;

four rigid rails each detachably connectable along an edge of the sheet for collectively forming a rigid rim; and four corner connectors each having tang means extending through such aligned openings for securing the corners of the sheet together and means for overlapping the ends of a pair of adjacent rails for securing the rails along the edges of the sheet.

41. A tray as recited in claim 40 wherein each corner connector comprises a concave outside clamshell mating with the outside of the corner and a convex inside clamshell mating with the inside of the corner, and wherein the tang means interconnects the inside and outside clamshells.

42. A tray as recited in claim 41 wherein the inside and outside clamshells are interconnected by an integral membrane of plastic thin enough to withstand repeated bending as a hinge extending diagonally across a corner inside the tray.

43. A tray as recited in claim 40 wherein each corner connector comprises a convex inside moiety for fitting inside the corner of the tray, and a concave outside moiety for fitting outside the corner of the tray, with a top portion overlapping an end portion of each of the adjacent rails, the tang means interconnecting the inside and outside moieties.

44. A tray as recited in claim 43 wherein the inside moiety and outside moiety collectively substantially completely surround an end portion of each of the adjacent rails.

45. A tray comprising:
   a rectangular sheet for forming the bottom and sides of the tray, each corner of the sheet having a generally V-shaped notch and having at least one opening through the sheet on each edge of the notch; and
   four corner connectors, each corner connector comprising:
      an outside moiety fitting over the outside of a corner of the tray;
      an inside moiety fitting inside a corner of the tray;
      at least one aperture through one of the moieties; and
      at least one elastically bendable tang means extending from the other moiety for snapping through the openings through the sheet and through such an aperture through the other moiety for connecting the corners of the sheet and latching one moiety to the other moiety.

46. A tray as recited in claim 45 wherein openings on each side of the notch align in a plane bisecting the corner and the tang means extends through such aligned apertures.

47. A tray as recited in claim 46 wherein the openings comprise at least a pair of openings through the sheet on each edge of the notch, the openings along each edge of the notch being on a line normal to the adjacent edge of the sheet so that when the openings are aligned on a plane bisecting the corner of the tray, the corner is substantially normal to the plane of the center of the sheet and wherein tang means extends through each of such aligned openings.

48. A tray as recited in claim 45 wherein each tang means comprises a pair of elastically bendable tang members each having a half-arrow cross section.

49. A tray as recited in claim 48 wherein the tang members are on the outside moiety extending towards the inside of the tray and the two tang members straddle a plane bisecting the corner, and wherein the apertures are through the inside moiety and comprise generally rectangular holes for receiving the tang members.

50. A tray as recited in claim 49 in which the apertures through the inside moiety comprise converging ramp surfaces for elastically bending the tang members towards each other, and latch surfaces adjacent the ramp surfaces for latching the tang members.

51. A tray as recited in claim 45 wherein each corner connector further comprises hinge means for interconnecting the outside moiety and inside moiety along a hinge line extending diagonally across a corner of the tray.

52. A tray as recited in claim 51 wherein the hinge means comprises a plastic membrane integral with the outside moiety and the inside moiety and thin enough for withstanding repeated bending.

53. A tray comprising:
   a flat elastically bendable rectangular sheet for forming the bottom and sides of the tray without creasing the sheet, each corner of the sheet having a generally V-shaped notch having an included angle of less than 90° for overlapping edges of the notch upon elastically bending of edges of the sheet into a plane approximately normal to the plane of the center of the sheet and upon elastically bending portions of the sheet adjacent the notches, each corner comprising a pair of openings on each edge of the notch lying on a line normal to the adjacent edge of the sheet so that openings on overlapped edges of the notch align on a plane bisecting a corner of the tray and the corner is substantially normal to the plane of the sheet in the center of the tray, each corner further comprising an eye on one edge of the notch and a hook on the opposite edge of the notch for engaging the eye and temporarily hooking the edges of the notch together with the openings in alignment;
   four straight rigid rails each having a generally U-shaped cross section for receiving an edge of the sheet, the rails collectively forming a rigid rim for the tray; and
   four corner connectors for securing the corners of the sheet together, each corner connector comprising:
      a concave clamshell moiety mating with the outside of the corner;
      a convex clamshell moiety mating with the inside of the corner;
      a membrane of plastic material integral with the inside clamshell and with the outside clamshell and thin enough to withstand repeated bending along a hinge line extending diagonally across the corner inside the tray;
      tang means extending inwardly from the outside clamshell moiety through aligned openings through the sheet;
      a pair of apertures through the inside clamshell moiety for receiving the tang means and latching the clamshell moieties in a closed position on the corner of the tray;
      a top portion on the outer clamshell moiety extending over the top of the ends of an adjacent pair of rails for securing the rails on the edges of the sheet;
      a lip on the inside moiety and a lip on the outside moiety adjacent each lateral edge of the corner connector for engaging a side of the corresponding rail at a location spaced apart from the end of the rail;
      a ridge in the concave outside moiety and a ridge on the convex inside moiety spaced apart from each respective lip for engaging the sides of such a rail at a location spaced apart from engagement of the rail by the lips for holding an adjacent pair of rails at a right angle and inhibiting racking of the rim.

54. A tray as recited in claim 53 wherein the tang means comprises a pair of elastically bendable tang members each having a half-arrow cross section, the pair of tang members straddling a plane bisecting the corner of the tray, and wherein the apertures through the inside clamshell moiety comprise converging ramp surfaces for elastically bending the tang members towards each other and latch surfaces adjacent the ramp surfaces for latching the tang members.

* * * * *